United States Patent
Honkasalo

(10) Patent No.: US 6,317,413 B1
(45) Date of Patent: Nov. 13, 2001

(54) METHOD AND APPARATUS FOR ASSIGNING VARIABLE LENGTH WALSH CODES IN A SPREAD SPECTRUM SYSTEM

(75) Inventor: Zhi-Chun Honkasalo, Vantaa (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/080,908

(22) Filed: May 18, 1998

(51) Int. Cl.[7] ................................................ H04J 11/00
(52) U.S. Cl. ................................. 370/209; 370/342
(58) Field of Search .................................. 370/209, 204, 370/208, 320, 335, 342, 441; 375/130, 140, 136, 1

(56) References Cited

U.S. PATENT DOCUMENTS

| | | | |
|---|---|---|---|
| 5,515,396 | * 5/1996 | Dalekotzin | 375/136 |
| 5,712,869 | * 1/1998 | Lee et al. | 370/209 |
| 5,715,236 | * 2/1998 | Gilhousen et al. | 370/209 |
| 5,790,588 | * 8/1998 | Fukawa et al. | 370/342 |
| 5,822,359 | * 10/1998 | Bruckert et al. | 370/209 |
| 5,940,434 | * 8/1999 | Lee et al. | 370/209 |

* cited by examiner

Primary Examiner—Chau Nguyen
Assistant Examiner—Phuongchau Ba Nguyen
(74) Attorney, Agent, or Firm—Brian T. Rivers

(57) ABSTRACT

A method and apparatus for assigning Walsh codes in a direct sequence spread spectrum (DS-SS) telecommunications system. Walsh code sets are each generated from a different Walsh code $C_x$ of length N. Each of the code sets is mutually disjoint to one another, i.e., each is generated from a different Walsh code $C_x$ of length N, and each Walsh code $C_x$ is from the same Walsh code matrix W. Each code set may be used to support a set of parallel CDMA channels. Because the codes of each Walsh code set are generated from the same $C_x$, a number of least significant bits from the code indexes of the codes in the set are equal and identical to the code index for the $C_x$ used to generate the set. Assignment messages may be reduced in length by preassigning the code index of $C_x$ to selected channels and then transmitting only the additional information necessary to specify the index of the assigned codes from the general code set generated from the $C_x$.

20 Claims, 5 Drawing Sheets

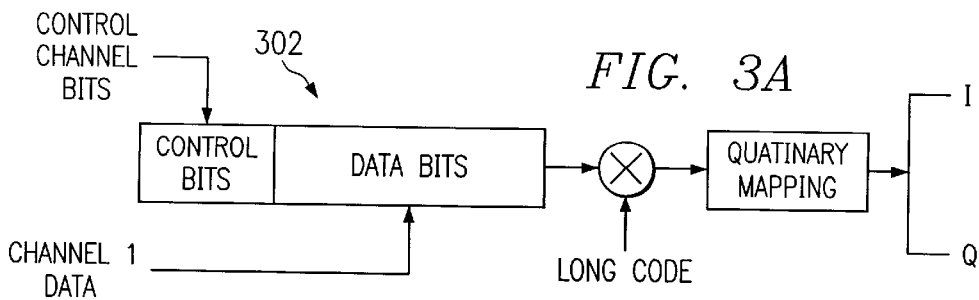

FIG. 3A

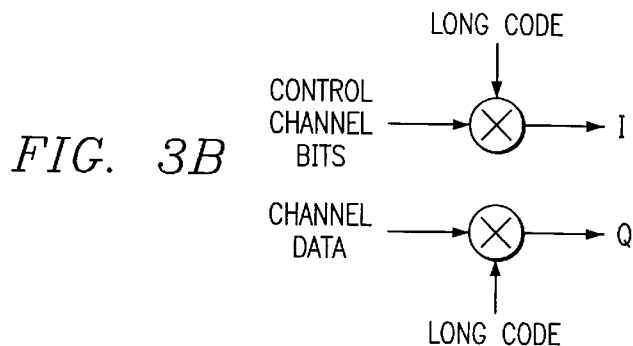

FIG. 3B $$W_{16} = \begin{array}{c} c_0 \\ c_1 \\ c_2 \\ c_3 \\ c_f \begin{array}{c} c_4 \\ c_5 \end{array} \\ c_6 \\ c_s \begin{array}{c} c_7 \\ c_8 \end{array} \\ c_9 \\ c_{10} \\ c_{11} \\ c_{12} \\ c_{13} \\ c_{14} \\ c_{15} \end{array} \begin{vmatrix} 0 & 0 & 0 & 0 & 0 & 0 & 0 & 0 & 0 & 0 & 0 & 0 & 0 & 0 & 0 & 0 \\ 0 & 1 & 0 & 1 & 0 & 1 & 0 & 1 & 0 & 1 & 0 & 1 & 0 & 1 & 0 & 1 \\ 0 & 0 & 1 & 1 & 0 & 0 & 1 & 1 & 0 & 0 & 1 & 1 & 0 & 0 & 1 & 1 \\ 0 & 1 & 1 & 0 & 0 & 1 & 1 & 0 & 0 & 1 & 1 & 0 & 0 & 1 & 1 & 0 \\ 0 & 0 & 0 & 0 & 1 & 1 & 1 & 1 & 0 & 0 & 0 & 0 & 1 & 1 & 1 & 1 \\ 0 & 1 & 0 & 1 & 1 & 0 & 1 & 0 & 0 & 1 & 0 & 1 & 1 & 0 & 1 & 0 \\ 0 & 0 & 1 & 1 & 1 & 1 & 0 & 0 & 0 & 0 & 1 & 1 & 1 & 1 & 0 & 0 \\ 0 & 1 & 1 & 0 & 1 & 0 & 0 & 1 & 0 & 1 & 1 & 0 & 1 & 0 & 0 & 1 \\ 0 & 0 & 0 & 0 & 0 & 0 & 0 & 0 & 1 & 1 & 1 & 1 & 1 & 1 & 1 & 1 \\ 0 & 1 & 0 & 1 & 0 & 1 & 0 & 1 & 1 & 0 & 1 & 0 & 1 & 0 & 1 & 0 \\ 0 & 0 & 1 & 1 & 0 & 0 & 1 & 1 & 1 & 1 & 0 & 0 & 1 & 1 & 0 & 0 \\ 0 & 1 & 1 & 0 & 0 & 1 & 1 & 0 & 1 & 0 & 0 & 1 & 1 & 0 & 0 & 1 \\ 0 & 0 & 0 & 0 & 1 & 1 & 1 & 1 & 1 & 1 & 1 & 1 & 0 & 0 & 0 & 0 \\ 0 & 1 & 0 & 1 & 1 & 0 & 1 & 0 & 1 & 0 & 1 & 0 & 0 & 1 & 0 & 1 \\ 0 & 0 & 1 & 1 & 1 & 1 & 0 & 0 & 1 & 1 & 0 & 0 & 0 & 0 & 1 & 1 \\ 0 & 1 & 1 & 0 & 1 & 0 & 0 & 1 & 1 & 0 & 0 & 1 & 0 & 1 & 1 & 0 \end{vmatrix}$$

FIG. 4

METHOD AND APPARATUS FOR ASSIGNING VARIABLE LENGTH WALSH CODES IN A SPREAD SPECTRUM SYSTEM

FIELD OF THE INVENTION

This invention relates to direct sequence spread spectrum (DS-SS) telecommunications systems. More specifically, this invention relates to a method and apparatus for Walsh code assignment in a direct sequence spread spectrum system having variable data rates and a variable number of channels available to a user.

BACKGROUND OF THE INVENTION

In the field of telecommunications, efforts have recently been directed toward developing advanced direct sequence spread spectrum (DS-SS) telecommunications systems. One example of a DS-SS type system is a Code Division Multiple Access (CDMA) type system.

In a CDMA type system multiple users, each using a channel identified by a uniquely assigned digital pseudonoise (PN) code sequence, simultaneously communicate with the system while sharing the same wideband frequency spectrum. Channel identification is achieved by using the unique PN code sequence to spread a digital information signal that is to be transmitted. The digital information signal may be a signal, such as the output of a digitized voice circuit having a bit rate, for example, of from 8–13 kbps, or a data signal having a higher bit rate. The PN code sequence has a bit rate greater than the bit rate of the information signal.

During spreading, the digital signal bandwidth is spread through the frequency bandwidth of the PN code sequence. Spreading is achieved by multiplying the PN code sequence and information signal together in the time domain to generate a spread signal that has a bit rate of the PN code sequence. The spread signal is then RF modulated and transmitted on a carrier frequency that may also carry transmissions of information signals for other system users, where the other information signals have been spread by PN code sequences unique to each of the other users. The PN code sequences may be identified by having a unique phase or a unique bit sequence. In certain systems, such as a system operating according to the Telecommunications Industry Association/Electronic Industry Association (TIA/EIA) IS-95-A cellular system standard, a transmission may be identified by two PN sequences. In IS-95-A an individual base station is assigned a unique phase for a common system PN code sequence that spreads all forward link transmissions from base stations of that system. The unique phase identifies the base station. Each transmission from a base station is then assigned a unique Walsh code sequence that identifies the particular base station channel on which the transmission is sent.

At the receiver, after carrier frequency demodulation, despreading or correlation is accomplished by generating a local replica of the transmitting user's assigned PN code(s) with a random-sequence generator in the receiver and then synchronizing the local PN code sequence(s) to the PN code sequence(s) that was superimposed on the incoming received signal in the transmitter. By removing the random sequence from the received signal and integrating it over a symbol period, a despread signal is obtained which ideally exactly represents the original digital information signal.

Because data transmission applications other than conventional voice traffic transmissions are becoming increasingly important in the cellular system area, a system operator who operates a CDMA system may desire to provide services other than phone voice service. Examples of these other services include portable computer modem service or video service. Often, these other services may require that data be transmitted at a rate much faster than that required for voice transmission.

Developments in the cellular industry have moved in the direction of satisfying requirements for higher data rate cellular service. For example, a new version of the IS-95-A specification to be published as TIA/EIA IS-95 includes supplemental channels. Up to seven supplemental channels in addition to a fundamental channel may be added for use between a mobile station and base station, allowing a total of eight channels for data transmission on each of the forward (base-to-mobile) and reverse (mobile-to-base) links. Data can be transmitted at rates of up to 115.2 kbps (a maximum of 14.4 kbps for each channel) if all seven supplemental channels are utilized.

For the next generation CDMA cellular systems, it has been proposed to further increase the data transmission rate above that available in IS-95 by using variable length Walsh codes on the forward link channels. In schemes of this type, a constant chip rate is used for the Walsh codes but the length of the Walsh code varies according to the data rate. For example, this type of scheme could be implemented in a system similar to an IS-95 system by using the orthogonal standard 64-bit Walsh code at a chip rate of 1.22 mcps for 9.6 kbps transmission and using shorter lengths of the Walsh code at the same chip rate for other data rates. For 19.2 kbps a 32-bit Walsh code at a chip rate of 1.22 mcps could be used. At 19.2 kbps the spreading factor would be halved as compared to 9.6 kbps, i.e., each bit of data would be spread (multiplied) by half as many chips. The data frame could be a constant 20 msec. in length with the amount of data contained in a frame proportional to the data rate.

The next generation high data rate of CDMA cellular systems will be required to offer both conventional services, such as voice service, and packet data services. Efficient utilization of the variable length Walsh codes is required, because the required orthogonality limits the number of codes from which to choose. For example, in a CDMA system where the chip rate is three times the IS-95A chip rate, the Walsh code will be assignable from a Walsh code space of 256 codes of 256 bits in length. The 256 codes allow capacity to carry a total of 256×14.4 kbps of traffic per call using ½-rate convolution coding. Although this is greater than three times what is needed for the theoretical upper limit of the spectrum efficiency, due to interference reasons, these code are still reasonably limited. It would be inefficient to preassign these codes to a large group of packet users who only use traffic channels in a burst mode when the bursts are infrequent. Use of the system requires dynamic assignment of the Walsh codes at the time when a traffic channel is actually required.

In order to achieve efficient packet data routing in next generation systems, it will be necessary to assign and reassign traffic channels very frequently among numerous users. The dynamic nature of packet data traffic requires that as soon as one packet data service user finishes a channel, it can be assigned quickly to another packet data service user. Because each multi-rate traffic channel is spread by a Walsh code having a length corresponding to the data rate on the channel, Walsh code index and length information must be sent to each packet data user before the channel can be used. The use of supplemental channels to realize multiple traffic channels combined with the use of variable length Walsh codes increases the signaling overhead needed to assign the Walsh codes to a mobile station. This signaling overhead can be excessive if the code index is large and particularly if multiple codes need to be assigned. In order to realize an efficient system, it is desirable that this overhead be minimized.

OBJECTS OF THE INVENTION

It is, therefore, an object of the invention to provide an improved method and apparatus for assigning variable length Walsh codes in a direct sequence spread spectrum (DS-SS) system.

It is another object of the invention to provide a method and apparatus for assigning variable length Walsh codes in a direct sequence spread spectrum (DS-SS) system, wherein the variable length Walsh codes are assigned to at least one channel, so that the signaling overhead necessary to assign the codes to a receiver using the at least one channel is minimized.

It is a further object of this invention to provide a method and apparatus for assigning variable length Walsh codes in a direct sequence spread spectrum (DS-SS) system, wherein the variable length Walsh codes are assigned to at least one traffic or packet data channel, so that the signaling overhead necessary to dynamically assign the codes to receivers using the at least one traffic or packet data channel is minimized.

SUMMARY OF THE INVENTION

The invention provides a method and apparatus for assigning Walsh codes in a direct sequence spread spectrum (DS-SS) telecommunications system having variable data rates and a variable number of channels assignable to a user. Assignment of variable length Walsh codes is done so that assignment message length and signaling overhead are minimized. This assignment method reduces the signaling overhead necessary for dynamic assignment of code sets on multiple channels using multi-rate operation.

Walsh code sets are each generated from a Walsh code $C_x$ of length N. Each of the code sets is mutually disjoint to one another, i.e., each is generated from a different Walsh code $C_x$ of length N from a Walsh code matrix W. Each code set may be used to support a set of parallel CDMA channels. Because the codes of each Walsh code set are generated from the same $C_x$, a number of least significant bits in the code indexes of the codes in each set are equal and identical to the code index for the $C_x$ used to generate the set. Assignment messages may be reduced in length by preassigning the code index of a $C_x$ to selected channels using the generated code set, and then transmitting only the additional information necessary to specify the index of the assigned codes from the generated code set when a selected channel is used.

In an embodiment of the invention, the method and apparatus is implemented into a CDMA system in which a single user may be assigned a fundamental and multiple parallel supplemental CDMA channels, with each channel carrying a data rate that depends on the length of the Walsh code assigned to that channel.

Each fundamental channel is a dedicated fixed rate connection at X kbps using a Walsh code of length M. Each of the Walsh codes of length M used on the fundamental channels is generated from a Walsh code, $C_f$, of length N. $C_f$ is chosen from a Walsh code matrix $W_n$. $C_f$ may be used to generate N Walsh codes of length M and has an m-bit code index that distinguishes it from other super codes in the matrix $W_n$. Each of the N Walsh codes generated from $C_f$ may be used for one fundamental channel. Each of the N Walsh codes for the fundamental channels may be distinguished from one another by its code index of length l, where $2^l = M$. Because each of the N Walsh codes is generated from $C_f$, the least m significant bits of each code's index, where $2^m = N$, are equal to the code index f for $C_f$.

Each supplemental channel may be at data rates of x, 2x ... Nx kbps. The supplemental channels each use a Walsh code of length M, M/2, ... or M/N for data rates of x, 2x ... or Nx kbps, respectively. The supplemental channel Walsh codes are each generated from a Walsh code $C_s$ of length N, where $C_s$ is chosen from the Walsh code matrix $W_n$, and is mutually orthogonal to $C_f$. The supplemental channel Walsh codes may vary in length, with length depending on the data rate.

Each of the Walsh codes for the supplemental channels may also be identified by its code index The code index for each supplemental channel Walsh code will be a data rate dependent variable length code index of length z, where $$2^z = M\left(\frac{x}{\text{actual data rate}}\right).$$

The least significant m bits of the index of each supplemental Walsh code will be equal to the code index s for the $C_s$ used to generate the supplemental Walsh code.

In the embodiment a mobile accessing a base station may be preassigned a code index f for $C_f$. This will give the mobile the m least significant bits of the code index of any fundamental channel Walsh code it may be assigned that is generated from $C_f$. The mobile may also be preassigned a code index s for $C_s$.

Subsequent to the preassignment of the code indexes f and s, in order to assign a mobile station a Walsh code for the fundamental channel, the fundamental channel assignment message needs only to include the I-m most significant bits of the code index of the assigned Walsh code, because the m least significant bits are equal to the code index f, which has been preassigned.

The Walsh codes for the supplemental channels may be assigned using a supplemental channel assignment message that includes a field of an adequate number of bits to convey data rate information and a variable length field for the index of the Walsh code assigned to the supplemental channel. Because the code index s (the s least significant bits) of the supplemental channel Walsh codes is preassigned, the variable length field for the index is of length n where n bits are needed, in addition to the preassigned code index s, to indicate the index of the Walsh code assigned to the supplemental channel.

BRIEF DESCRIPTION OF THE DRAWINGS

The above set forth and other features of the invention are made more apparent in the ensuing Detailed Description of the Invention when read in conjunction with the attached Drawings, wherein:

FIGS. 3A and 3B are diagrams illustrating alternate embodiments of MUX 118 of FIG. 1;

FIG. 4 illustrates a Walsh code matrix $W_{16}$ from which Walsh codes $W_f$ and $W_s$ are chosen according to an embodiment of the invention.

DETAILED DESCRIPTION OF THE INVENTION

Figure 1:
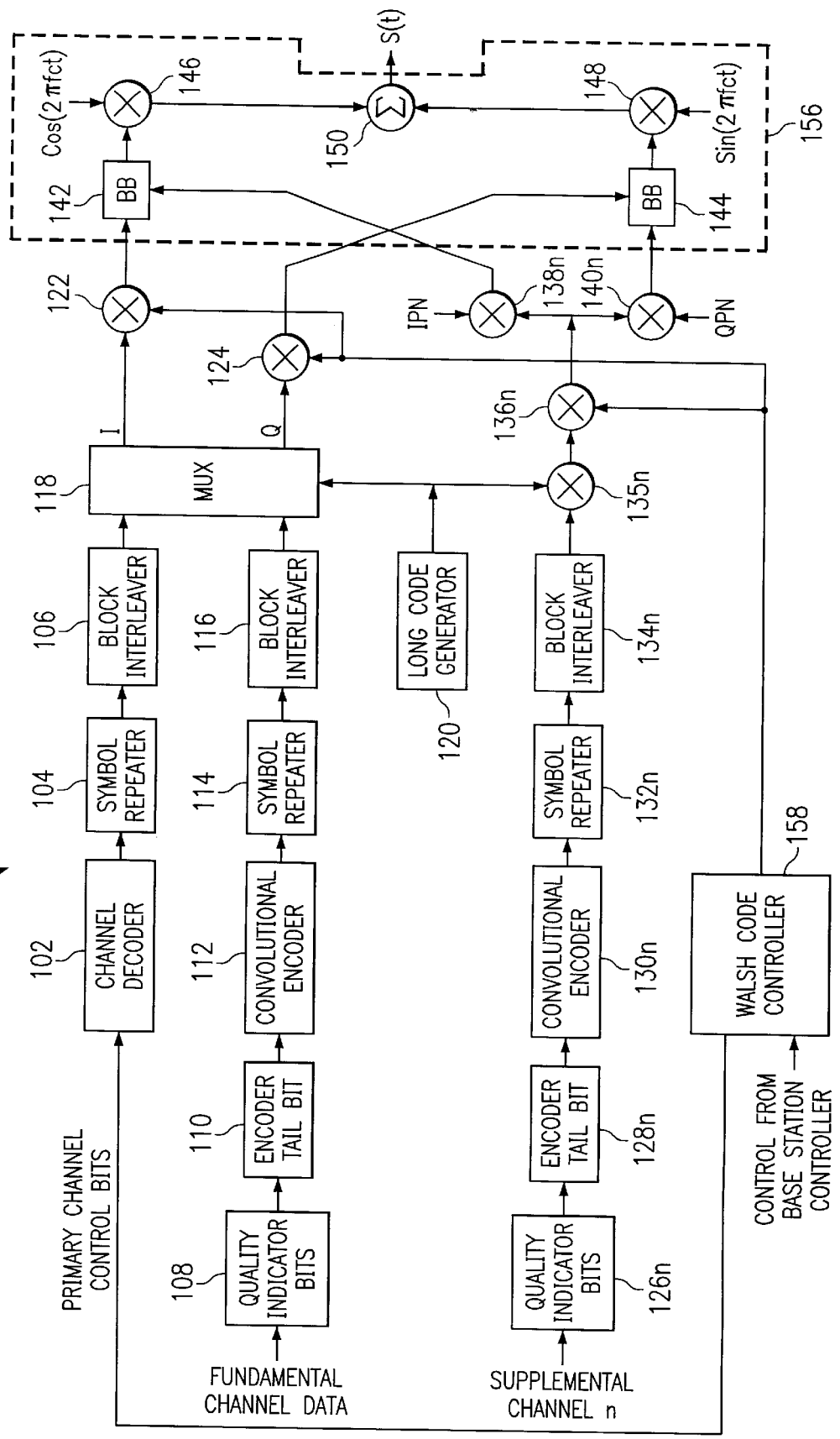
FIG. 1 is a block diagram of a CDMA transmitter constructed and operated according to an embodiment of the invention.

Referring now to FIG. 1, therein is a block diagram showing a CDMA transmitter 100 constructed and operated according to an embodiment of the invention. Transmitter 100 is implemented to transmit variable rate data to a receiver on a fundamental channel and at least one supplemental channel. Transmitter 100 may be implemented in a base station of a CDMA cellular system where it would represent the transmitter for a forward link channel for transmitting from the base station to a mobile station. A base station of a CDMA cellular system could include more than one transmitter, such as transmitter 100, for other forward link transmissions to other mobile stations. Each of the forward link transmission channels is distinguished from one another by selection of the appropriate channel coding according to the invention. In the case where a base station includes more than one transmitter, the equivalent functions for some or all transmitters, equivalent to those functions indicated for the blocks shown in FIG. 1, could be implemented in common software or hardware.

The fundamental channel portion of transmitter 100 includes channel encoder 102, symbol repeater 104, block interleaver 106, multiplexer (mux) 118, quality indicator bit block 108, encoder tail bit block 110, convolutional encoder 112, symbol repeater 114, block interleaver 116, long code generator 120, and Walsh code spreaders 122 and 124. Each supplemental channel portion of transmitter 100 for a supplemental channel n includes quality indicator bit block 126n, encoder tail bit block 128n, convolutional encoder 130n, symbol repeater 132n, block interleaver 134m, long code spreader 135n, Walsh code spreader 136n, I PN spreader 138n, and Q PN spreader 140n. Outputs for Walsh spreaders 122 and 124 from the primary channel and outputs from I PN spreader 138n and Q PN spreader 140n from each supplemental channel are input for transmission to RF portion 156 which includes base band filters (BB) 142 and 144, cosine wave modulator 146, sine wave modulator 148, and combiner 150. Walsh code controller 158 includes software and hardware configured to generate appropriate control signals and implement control signals of transmitter 100, according to the embodiment of the invention. Walsh code controller 158 may receive control signals from a base station controller for coordination with other transmitters of the system.

In the embodiment of the invention, each forward link fundamental channel that carries data to a mobile station is assigned a Walsh code $W_f$ of length M=256 that is Oenerated from a Walsh code $C_f$ of length N=16 from a Walsh code matrix $W_{16}$. The Walsh codes in Walsh code matrix $W_{16}$ are each orthogonal to all other Walsh codes in matrix $W_{16}$. Each forward link supplemental channel n, n=1 ... J, is also assigned a Walsh code $W_s$ of length that is generated from a Walsh code $C_s$ of length 16 from the Walsh code matrix $W_{16}$. FIG. 4 illustrates an example of the Walsh code matrix $W_{16}$ from which Walsh codes $W_f$ and $W_s$ are chosen according to an embodiment of the invention. In this example, $C_f=C_4$ and $C_s=C_7$. Because $C_s$ and $C_f$ are both from the orthogonal matrix $W_{16}$, the fundamental and supplemental code channel assignments are orthogonal to one another.

Each fundamental channel is implemented as a dedicated low speed connection, carrying 14.4 kbps with the Walsh code $W_f$ of length 256. Each supplemental channel may carry 14.4×J kbps with the Walsh code length of $$\frac{256}{J}$$

with J=1, 2, 4, 8 and 16.

The portion of the resources assigned to fundamental and supplemental channels from Walsh code matrix $W_{16}$ is dynamic and depends on the number of simultaneous connections needed. The division of these resources can be dynamically updated at intervals. For example, packet data service may be assigned the capacity of two separate sets of 16 Walsh codes of length 256. In the embodiment, each set includes codes that are generated from a set of codes of length 16. $C_f$ is used to generate the codes used for the fundamental forward link channels, and $C_s$ is used to generate the codes for forward link supplemental channels. More than one $C_f$ or $C_s$ may also be used.

Table 1 illustrates how sets of codes may be generated from a code $C_k$ from a matrix $W_{16}$. For example, to generate a set of four codes of length 64 to each carry data at 57.6 kbps, the codes $C_k$, $C_{k+16}$, $C_{k+32}$ and $C_{k+64}$ would be taken from the matrix $W_{64}$.

TABLE 1

| Walsh Code Set | Indexing | | Code Length | Carried Data Rate |
| --- | --- | --- | --- | --- |
| $C_k$ | | | 16 | 230.4k |
| $[C_{kl}]$, k1 = k + 16t | t = 0, 1 | | 32 | 115.2k |
| $[C_{kl}]$, k1 = k + 16t | t = 0, 1, 2, 3 | | 64 | 57.6k |
| $[C_{kl}]$, k1 = k + 16t | t = 0, 1, 2, ... 7 | | 128 | 28.8k |
| $[C_{kl}]$, k1 = k + 16t | t = 0, 1, 2, ... 15 | | 256 | 14.4k |

Figure 5A:
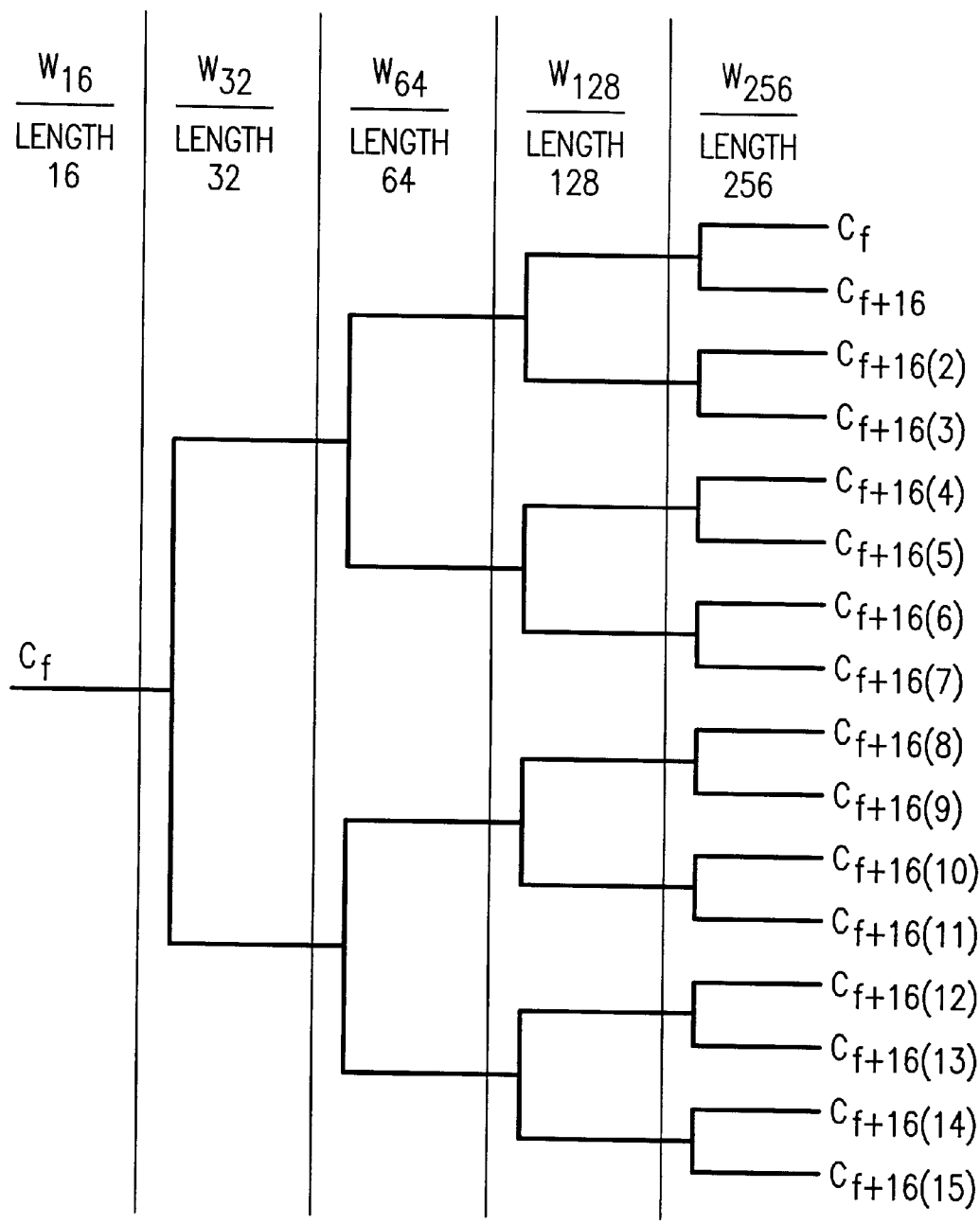
FIGS. 5A and 5B are diagrams illustrating generation of codes from Walsh codes $C_f$ and $C_s$, respectively, of matrix $W_{16}$.

FIG. 5A illustrates the generation of the Walsh codes $C_f$ ... $C_{f+16(15)}$ for the fundamental channels. Each of the Walsh codes $C_f$ ... $C_{f+16(15)}$ represents one of the 16 Walsh codes from the matrix $W_{256}$ of size 256×256 that is generated from the matrix $W_{16}$. Each of the codes $C_f$ ... $C_{f+16(15)}$ may be identified by the eight-bit code index for matrix $W_{256}$ that identifies the code in matrix $W_{256}$. Since codes $C_f$ ... $C_{f+16(15)}$ are all generated from the same $C_f$ of length 16, the four least significant bits of the eight-bit code index are identical for all the codes $C_f$ ... $C_{f+16(15)}$. This is equal to the index f for $C_f$. If the four-bit index of $C_f$ is preassigned, a four-bit field for additional code index information is needed in a code assignment message to assign a code to a fundamental channel.

Figure 5B:
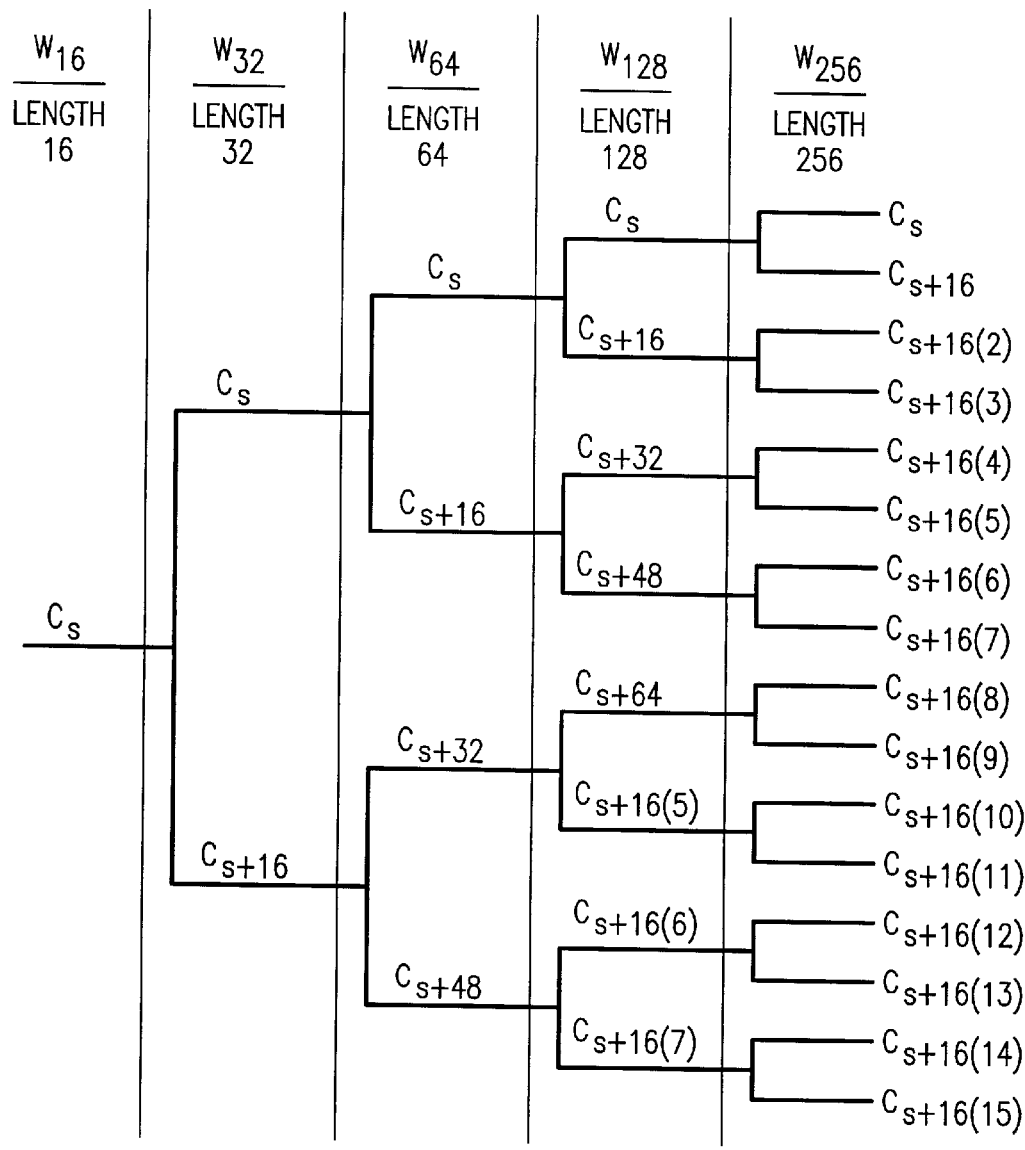

FIG. 5B illustrates the generation of the Walsh codes $C_s$ ... $C_{sn}$ for the supplemental channels. FIG. 5B illustrates the codes generated from $C_s$ of matrix $W_{16}$ for each of the matrices $W_{16}$, $W_{64}$, $W_{128}$ and $W_{256}$ While the Walsh codes for the fundamental channels are fixed at a length of 16, the length of the Walsh codes assigned to the supplemental channels may vary, depending on the desired data rate. The codes may be assigned from the matrix $W_{16}$, $W_{32}$, $W_{64}$, $W_{128}$ and $W_{256}$ with lengths of 16, 32, 64, 128 and 256, respectively, as shown. Walsh codes $C_{s1}$ ... $C_{sn}$ may be used to obtain the data rate capacities shown in Table 1. Table 1 shows the data rate capacity obtainable from a Walsh code $C_s$, with s=k in the rightmost column.

In the embodiment of the invention multicode code operation may be carried out by using codes $C_{s1}$ ... $C_{sn}$ assigned to the same mobile. For example, the codes $C_s$ and $C_{s+16}$ of length 32 from a matrix $W_{32}$ and generated from a $C_s$ of length 16 from matrix $W_{16}$ will be assigned to carry the capacity of $C_s$ from matrix $W_{16}$ and will be assigned to the same mobile depending on the data rate assigned. If the four-bit index of the 16-bit $C_s$ is preassigned, a three-bit data rate indication and an n-bit field for additional code index information is needed in an assignment message to assign a code to a supplemental channel. Table 2 shows the necessary assignment fields for different data rates.

TABLE 2

| 3-bit rate indication field | n-bit field length for additional code index information | Assigned supplemental channel rate | Assigned Walsh code index (code length) |
|---|---|---|---|
| 000 | n = 0 | 230.4 kbps | [xxxx] (4-bit) |
| 001 | n = 1 | 115.2 kbps | [z, xxxx] (5-bit) |
| 010 | n = 2 | 57.6 kbps | [zz, xxxx] (6-bit) |
| 011 | n = 3 | 28.8 kbps | [zzz, xxxx] (7-bit) |
| 100 | n = 4 | 14.4 kbps | [zzzz, xxxx] (8-bit) |
| | | | Where z = 0 or 1 |

For example, the codes $C_s$ and $C_{s+16}$ of length 32 may be assigned in a code assignment message with a three-bit rate field indicating 115.2 kbps bit field indicating one additional bit over the four-bit d index s. The codes may be used as Walsh codes $C_s$ and $C_{s+16}$ with indexes [0, xxxx] and [1, xxxx], respectively. The four common bits may be preassigned.

One preassigned code $C_s$, assigned by the field [xxx] may also be shared by more than one user. For example, in the case of two users, if user 1 is using a rate of 230.4 kbps and user 2 is not transmitting, then user 1 could use the $C_s$ from matrix $W_{16}$ for transmission. When user 1 and user 2 are each transmitting at 115.2 kbps, user 1 would use $C_s$ from the matrix $W_{32}$ and user 2 would use $C_{s+16}$ from the matrix $W_{32}$ where $W_{32}$ is generated from $W_{16}$. The system would monitor the mobile stations and assign and reassign the codes accordingly, using assignment messages according to Table 2, with Z set to 1 or 0.

As an alternative, supplemental channel rates may first be assigned channel numbers, and the channel numbers may then be used in assignment messages to assign codes and data rates to mobiles. For example, channel 0 may use a code of length 16, channels 1 and 2 may each use one of the codes of length 32, and channels 3, 4, 5 and 6 may each use one of the codes of length 64. If the index s of code $C_s$ is preassigned, the channel assignment message to a mobile then would include a five-bit field indicating the particular channel number 0–30 (configuration) of $C_s$ assigned to the mobile. If the mobile is assigned channel number 0, it would use the 16-bit code $C_s$. If the mobile is assigned channel 3, it would use a particular code of length 64 generated from $C_s$.

Referring again to FIG. 1, data to be transmitted on supplemental channel n is input to quality indicator block 126n. In the embodiment, the data may be at a rate of 14.4 kbps, 28.8 kbps, 57.6 kbps, 115.2 kbps or 230.4 kbps. In quality indicator block 126n, quality indicator bits are calculated and added to N data bits. Next, in Add encoder tail block 128n, encoder tail bits are added. Then in convolutional encoder 130n, the bits output from Add encoder tail block 128n are convolutionally encoded. If necessary, symbol repeater 132n adds symbols to the output of convolutional encoder 130n, so that all data frames transmitted are filled. Next, in block interleaver 134n, the bits output from convolutional encoder 130n are interleaved over a predetermined interleaving period. The processing of the bits in quality indicator block 126n, Add encoder tail block 128n, convolutional encoder 130n, symbol repeater 132n and block interleaver 134n may be performed according to a system specification as defined for the system in which transmitter 100 operates. Methods of processing bits for transmission in CDMA systems are known and will not be described in further detail.

Next, the interleaved bits are spread by the system long code from long code generator 120 in long code spreader 135n. The signal is also spread by the Walsh code $W_s$ in Walsh code spreader 136n, according to Walsh code controller 158. The Walsh spread signal is then spread a second time in each of I PN spreader 1 38n and Q PN Spreader 1 40n to generate a separate in-phase signal and a quadrature signal. Each of the in-phase and quadrature signals is then base band filtered in BB 142 and BB 144, respectively, and modulated in cosine wave modulator 142 and sine wave modulator 148, respectively, before combination in combiner 150 and transmission on the forward link carrier frequency.

The fundamental channel includes a control channel that carries or indicates the data transmission rate and Walsh code assignment in an assignment message transmitted to a receiver of a fundamental and one or more supplemental forward link channels assigned to the receiver. These control bits may be generated by Walsh code controller 158. Walsh code controller 158 will generate codes from Walsh code matrix $W_{16}$ using $C_f$ and $C_s$ according to the embodiment of the invention. Walsh code controller 158 may also generate codes under the control of a base station controller. Because individual supplemental channels may carry data at different rates, the control bits that may include the code assignment messages of the embodiment of the invention may include a supplemental channel identifier associated with each assignment message. The assignment message may be transmitted, along with fundamental channel data periodically, or whenever there is a change in data rate on a supplemental channel. The code assignment message may also be used to indicate the Walsh codes assigned to the fundamental channels and one or more supplemental channels during link setup of each channel.

The fundamental channel data to be transmitted is input to quality indicator block 108. The control channel data is input at channel encoder 102. The processing of the fundamental channel data in Add encoder tail block 110, convolutional encoder 112, symbol repeater 114 and block interleaver 106 and the processing of the control channel data in channel encoder 102, symbol repeater 104, and block interleaver 106 may be performed according to the system specification as defined for the CDMA system in which transmitter 100 operates. The fundamental channel data and control channel data are then output from block interleaver 106 and block interleaver 116, respectively, to mux 118.

Referring now to FIGS. 3A and 3B, therein are diagrams illustrating alternative embodiments of mux 118 of FIG. 1. In one alternative, shown in FIG. 3A, mux 118 frames the control bits and fundamental data bits in a frame 302, with the control bits comprising a block of data in the frame. After framing, the control and data bits are spread by the long code from long code generator 120 as offset for the base station and quatinary mapped onto the I and Q channel outputs of mux 118. The quatinary mapping places alternating sequences of two bits from the frame separately onto the I and Q channel outputs. The I and Q outputs are each then spread by the Walsh code assigned to the fundamental and control channels in Walsh code spreaders 122 and 124, respectively, according to Walsh code controller 158. The spread I and Q signals are then each base band filtered in BB 142 and BB 144, respectively, and modulated at cosine wave modulator 146 and sine wave modulator 148, respectively, in RF block 156, before combination and transmission.

In an alternative implementation of mux 118, shown in FIG. 3B, the output of block interleaver 106 is spread by the base station long code from long code generator 120 and output at the I channel output of mux 118. The output of block interleaver 116 is spread by the long code from long code generator 120 and output at the Q channel output of mux 118. The spread I and Q signals are then each base band filtered in BB 142 and BB 144 and modulated at cosine wave modulator 146 and sine wave modulator 148, respectively, in RF block 156, before combination and transmission.

Other methods of transmitting the control bits are possible. For example, a dedicated system control channel may carry the control bits to all mobiles, with specific control bits addressed to particular mobiles. This dedicated system control channel would not carry data.

Figure 2:
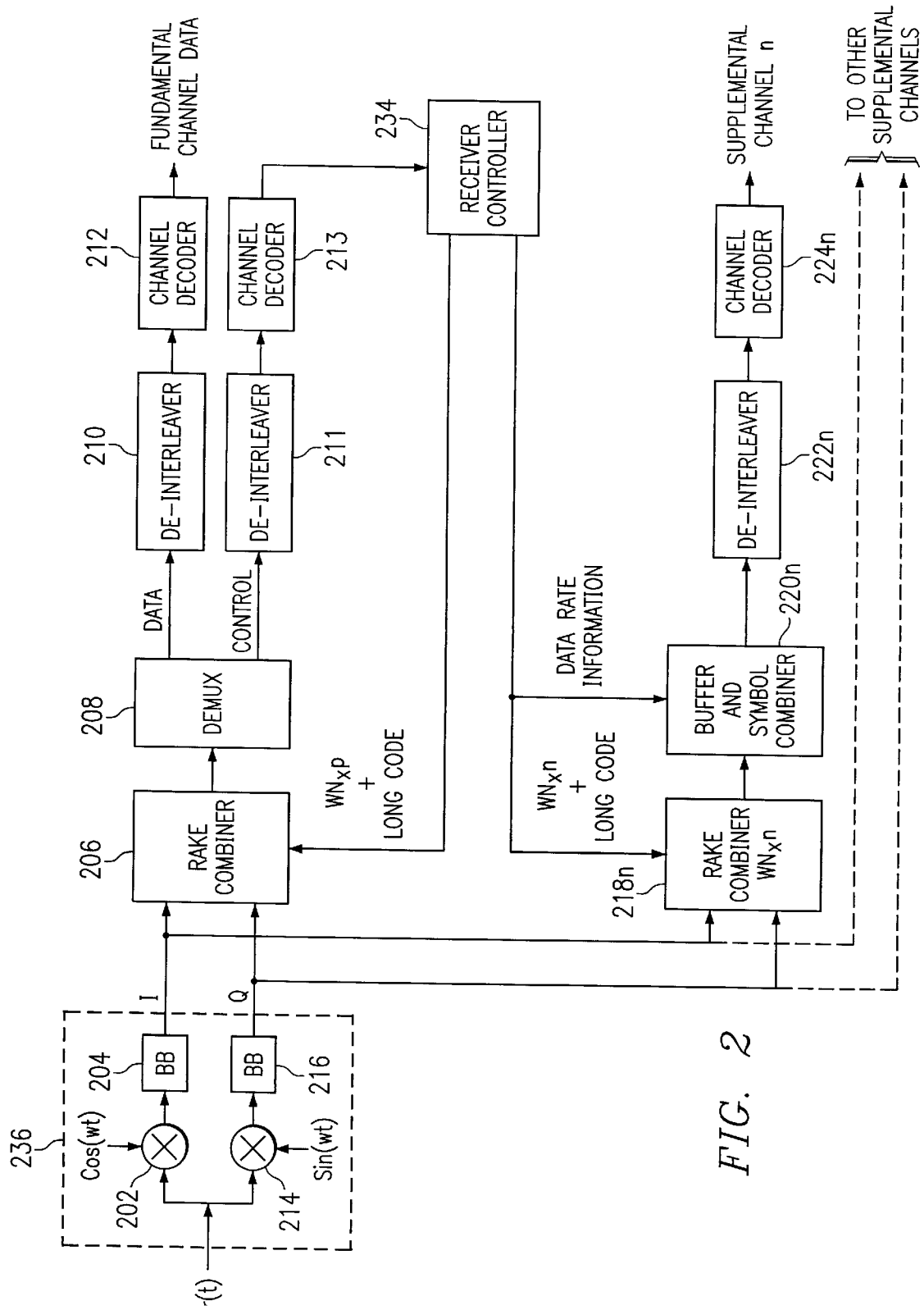
FIG. 2 is a block diagram of a CDMA receiver constructed and operated according to an embodiment of the invention.

Referring now to FIG. 2, therein is a block diagram of a CDMA receiver constructed and operated according to an embodiment of the invention. Receiver 200 is implemented to receive variable rate data that is transmitted from transmitter 100 of FIG. 1 on a fundamental channel and at least one supplemental channel. Receiver 200 may be implemented in a mobile station for operation in a CDMA cellular system, where it would represent the receiver on a forward link channel for receiving transmissions from a base station. Transmissions to receiver 200 are assigned to a fundamental channel and at least one supplemental channel, with channel coding implemented in transmitter 100 according to the embodiment of the invention.

The fundamental channel portion of receiver 200 includes RAKE combiner 206, Demultiplexer (demux) 208, deinterleavers 210 and 211 and channel decoders 212 and 214. Each supplemental channel portion of receiver 200 implementing a supplemental channel n includes RAKE combiner 218n, Buffer/symbol combiner 220n, deinterleaver 222n, and channel decoder 224n. The RF portion 236 of receiver 200 includes cosine wave demodulator 202, sine demodulator 214, base band filter (BB) 204, and base band filter (BB) 216. Receiver controller 234 includes software and hardware to implement control of receiver 200, according to the embodiment of the invention.

In the embodiment of the invention, receiver 200 receives a signal on the fundamental channel and each of the at least one supplemental channels assigned to the receiver. The forward link is set up, and RAKE combiner 206 and each RAKE combiner 218n search and synchronize to the appropriate primary or supplemental channel(s), using Walsh codes assigned in code assignment messages according to control data received during forward link setup and during operation according to the embodiment of the invention. The codes may be reassigned for the supplemental channels as necessary, as the data rate changes. Receiver controller 234 receives the control data, including the code assignment messages and controls RAKE combiners 206 and 218n to receive on the fundamental and supplemental channels accordingly. The forward link RF signal is received at the system carrier frequency. The received signal is demodulated in cosine demodulator 202, base band filtered in BB 204 to generate an in-phase signal 1. The signal I is then input to RAKE combiner 206 for the primary channel and RAKE combiner 218n for each supplemental channel. The received signal also is demodulated in sine wave demodulator 214, base band filtered in BB 216 to generate a quadrature signal Q. The signal Q is then input to RAKE combiner 206 for the fundamental channel and RAKE combiner 218n for each supplemental channel n.

The method and apparatus has application for any system that uses CDMA coding techniques to identify multiple parallel channels and in which signaling may be reduced by preassigning a particular set of codes. The codes could be of any length and number.

Thus, while the invention has been particularly shown and described with respect to particular embodiments thereof, it will be understood by those skilled in the art that changes in form and details may be made therein without departing from the spirit and scope of the invention.

What is claimed is:

1. A method of assigning Walsh codes to a plurality of CDMA channels, said method comprising the steps of:
   determining a plurality of M-bit codes from an N-bit code, said N-bit code having an I-bit index and each of said M-bit codes having an n-bit index, wherein at least one significant bit of said n-bit index for said M-bit code is equal to said I-bit index;
   transmitting said I-bit index to each of a plurality of receivers in a first message, each of said plurality of receivers for receiving on at least one of said plurality of CDMA channels;
   assigning each of said plurality of M-bit codes to one of the plurality of CDMA channels;
   transmitting each one of a plurality of n-I bit fields to a separate one of said plurality of receivers, wherein the number of bits in each of said plurality of n-I bit fields is equal to the number of bits in said n-bit index minus the number of bits of said I-bit index, each of said plurality of n-I bit fields comprising data bits, which are combined with said I-bit index to indicate an index of one of said plurality of M-bit codes.

2. The method of claim 1, wherein said plurality of CDMA channels comprises a first plurality of CDMA channels, said I-bit index comprises a first I-bit index, said N-bit code comprises a first N-bit code, and wherein said method further comprises the steps of:
   determining a plurality of variable length codes from a second N-bit code, said second N-bit code having a second I-bit index;
   transmitting said second I-bit index to each of said plurality of receivers in a third message;
   assigning a selected code of said plurality of variable length rate codes to each of a second plurality of CDMA channels; and
   transmitting each one of a plurality of variable length fields to a separate one of said plurality of receivers, each one of said plurality of variable length fields comprising data bits which are combined with said second I-bit index to indicate an index of one of said plurality of variable length codes.

3. The method of claim 2, wherein N=16, n=8, M=256 and I=4.

4. The method of claim 2, wherein said first plurality of CDMA channels comprises a plurality of fundamental channels and said second plurality of CDMA channels comprises a plurality of supplemental channels.

5. The method of claim 2, wherein each of said plurality of variable length fields comprises bits indicating a data rate.

6. The method of claim 5, wherein each of said plurality of variable length fields further comprises at least one bit indicating additional code index information.

7. The method of claim 1, wherein N=16, n=8, M=256 and I=4.

8. The method of claim 1, wherein said plurality of CDMA channels comprises a first plurality of CDMA channels, said I-bit index comprises a first I-bit index, said N-bit code comprises a first N-bit code and wherein said method further comprises the steps of:
- assigning each of a plurality of identifiers to one of a plurality of variable length code configurations, each of said variable length code configurations comprising at least one of a plurality of variable length codes generated from a second N-bit code, said second N-bit code having a second I-bit index;
- transmitting a selected identifier of said plurality of identifiers to a receiver; and
- transmitting a signal to said receiver on a CDMA channel, said channel spread by at least one variable rate code assigned to said selected identifier.

9. The method of claim 8, wherein N=16, n=8, M=256 and I=4 and wherein said plurality of identifiers comprises 30 identifiers.

10. An apparatus for assigning Walsh codes to a plurality of CDMA channels, said apparatus comprising:
- means for determining a plurality of M-bit codes from an N-bit code, said N-bit code having an I-bit index and each of said M-bit codes having an n-bit index, wherein at least one significant bit of said n-bit index for said M-bit code is equal to said I-bit index;
- means for transmitting said I-bit index to each of a plurality of receivers in a first message, each of said plurality of receivers for receiving on at least one of said plurality of CDMA channels;
- means for assigning each of said plurality of M-bit codes to one of the plurality of CDMA channels;
- means for transmitting each one of a plurality of n-I bit fields to a separate one of said plurality of receivers, wherein the number of bits in each of said plurality of n-I bit fields is equal to the number of bits in said n-bit index minus the number of bits of said I-bit index, each of said plurality of n-I bit fields comprising data bits, which are combined with said I-bit index to indicate an index of one of said plurality of M-bit codes.

11. The apparatus of claim 10, wherein said plurality of CDMA channels comprises a first plurality of CDMA channels, said I-bit index comprises a first I-bit index, said N-bit code comprises a first N-bit code, and wherein said apparatus further comprises:
- means for determining a plurality of variable length codes from a second N-bit code, said second N-bit code having a second I-bit index;
- means for transmitting said second I-bit index to each of said plurality of receivers in a third message;
- means for assigning a selected code of said plurality of variable length rate codes to each of a second plurality of CDMA channels; and
- means for transmitting each one of a plurality of variable length fields to a separate one of said plurality of receivers, each one of said plurality of variable length fields comprising data bits which are combined with said second I-bit index to indicate an index of one of said plurality of variable length codes.

12. The apparatus of claim 11, wherein N=16, n=8, M=256 and I=4.

13. The apparatus of claim 11, wherein said first plurality of CDMA channels comprises a plurality of fundamental channels and said second plurality of CDMA channels comprises a plurality of supplemental channels.

14. The apparatus of claim 11, wherein each of said plurality of variable length fields comprises bits indicating a data rate.

15. The apparatus of claim 14, wherein each of said plurality of variable length fields further comprises at least one bit indicating additional code index information.

16. The apparatus of claim 10, wherein N=16, n=8, M=256 and I=4.

17. The apparatus of claim 10, wherein said plurality of CDMA channels comprises a first plurality of CDMA channels, said I-bit index comprises a first I-bit index, said N-bit code comprises a first N-bit code and wherein said apparatus further comprises:
- means for assigning each of a plurality of identifiers to one of a plurality of variable length code configurations, each of said variable length code configurations comprising at least one of a plurality of variable length codes generated from a second N-bit code, said N-bit code having a second I-bit index;
- means for transmitting a selected identifier of said plurality of identifiers to a receiver; and
- means for transmitting a signal to said receiver on a CDMA channel, said channel spread by at least one variable rate code assigned to said selected identifier.

18. The apparatus of claim 10, wherein N=16, n=8, M=256 and I=4, and wherein said plurality of identifiers comprises 30 identifiers.

19. A method of assigning Walsh codes to a plurality of CDMA channels, said method comprising the steps of:
- determining at least one M-bit code from an N-bit code, said N-bit code having an I-bit index and said at least one M-bit code having an n-bit index, wherein at least one least significant bit of said n-bit index for said at least one M-bit code is equal to said I-bit index;
- transmitting said I-bit index to at least one receiver in a first message, said at least one receiver for receiving on at least one of said plurality of CDMA channels;
- assigning each of said at least one M-bit code to one of the plurality of CDMA channels; and
- transmitting each of at least one n-I bit field to a separate one of said at least one receiver, wherein the number of bits in each of said at least one n-I bit field is equal to the number of bits in said n-bit index minus the number of bits of said I-bit index, each of said at least one n-I bit field comprising data bits, which are combined with said I-bit index to indicate said n-bit index of one of said at least one M-bit code.

20. An apparatus for assigning Walsh codes to a plurality of CDMA channels, said apparatus comprising:
- means for determining at least one M-bit code from an N-bit code, said N-bit code having an I-bit index and said at least one M-bit code having an n-bit index, wherein at least one least significant bit of said n-bit index for said at least one M-bit code is equal to said I-bit index;
- means for transmitting said I-bit index to at least one receiver in a first message, said at least one receiver for receiving on at least one of said plurality of CDMA channels;
- means for assigning each of said at least one M-bit code to at least one of the plurality of CDMA channels;
- means for transmitting each of said at least one n-I bit field to a separate one of said at least one receiver, wherein the number of bits in each of said at least one n-I bit field is equal to the number of bits in said n-bit index minus the number of bits of said I-bit index, each of said at least one n-I bit field comprising data bits, which are combined with said I-bit index to indicate said n-bit index of one of said at least one M-bit code.

* * * * *